(12) United States Patent
Takada

(10) Patent No.: US 7,418,873 B2
(45) Date of Patent: Sep. 2, 2008

(54) METHOD AND DEVICE FOR PRODUCING ABSOLUTE PRESSURE-TYPE PRESSURE SENSOR

(75) Inventor: Akira Takada, Gyoda (JP)

(73) Assignee: Surpass Industry Co., Ltd, Saitama (JP)

( * ) Notice: Subject to any disclaimer, the term of this patent is extended or adjusted under 35 U.S.C. 154(b) by 0 days.

(21) Appl. No.: 11/630,120

(22) PCT Filed: Jun. 16, 2005

(86) PCT No.: PCT/JP2005/011050

§ 371 (c)(1),
(2), (4) Date: Dec. 20, 2006

(87) PCT Pub. No.: WO2006/003794

PCT Pub. Date: Jan. 12, 2006

(65) Prior Publication Data

US 2007/0272024 A1 Nov. 29, 2007

(30) Foreign Application Priority Data

Jul. 6, 2004 (JP) ............................. 2004-199390

(51) Int. Cl.
G01L 7/00 (2006.01)

(52) U.S. Cl. ...................................................... 73/756

(58) Field of Classification Search ................... 73/715, 73/756
See application file for complete search history.

(56) References Cited

U.S. PATENT DOCUMENTS

| 4,314,225 A | * | 2/1982 | Tominaga et al. ............... 338/4 |
| 4,930,353 A | * | 6/1990 | Kato et al. ..................... 73/727 |
| 5,173,836 A | | 12/1992 | Tomase et al. |
| 7,176,541 B2 | * | 2/2007 | Tanaka et al. ................ 257/419 |

FOREIGN PATENT DOCUMENTS

EP 0 849 578 6/1998
JP 58-63826 4/1983

* cited by examiner

*Primary Examiner*—Andre J Allen
(74) *Attorney, Agent, or Firm*—Young & Thompson

(57) ABSTRACT

There is provided a method and device for producing an absolute pressure type pressure sensor that enables a relative pressure type pressure sensor to be modified (converted) into an absolute pressure type pressure sensor in a simple and easy manner. The method is characterized by comprising: a step of arranging a relative pressure type pressure sensor, that has a reference pressure chamber therein, and a pressure guide hole whose one end communicates with the reference pressure chamber and the other end opens to the atmosphere, inside a vacuum chamber with the other end of the pressure guide hole opening upward; a step of placing a solder piece onto the other end of the pressure guide hole; a step of drawing a vacuum inside the vacuum chamber; and a step of heating the solder piece until the solder melts.

3 Claims, 4 Drawing Sheets

METHOD AND DEVICE FOR PRODUCING ABSOLUTE PRESSURE-TYPE PRESSURE SENSOR

TECHNICAL FIELD

The present invention relates to a method and device for producing an absolute pressure type pressure sensor, and to technology for modifying (converting) an existing relative pressure type (gauge pressure type) pressure sensor into an absolute pressure type pressure sensor.

BACKGROUND ART

An absolute pressure type pressure sensor and a relative pressure type pressure sensor are produced as absolute pressure and relative pressure types respectively (refer for example to patent documents 1 and 2).

Patent Document 1: Japanese Unexamined Patent Application, Publication No. Hei 05-87662

Patent Document 2: Japanese Unexamined Patent Application, Publication No. Hei 05-223676

DISCLOSURE OF INVENTION

Since an absolute pressure type pressure sensor measures in a zero vacuum state with no pressure at all, it has the shortcoming in that it is necessary to provide a process to make the internal pressure of its reference pressure chamber a vacuum state, and to maintain this state, so that the production process is complicated and production costs are also high.

On the other hand, since the relative pressure type pressure sensor measures with the atmospheric pressure as the reference pressure, with this as zero, it is not necessary to maintain the internal pressure of its reference pressure chamber in a vacuum state, as with the absolute pressure type pressure sensor, and the production process is simplified compared to the absolute pressure type pressure sensor, and production costs are also kept down.

The present invention takes into consideration the above-described situation, with an object of providing a method and device for producing an absolute pressure type pressure sensor that enables an absolute pressure type pressure sensor to be produced in a simple and easy manner, by enabling a relative pressure type pressure sensor to be modified (converted) into an absolute pressure type pressure sensor.

The present invention employs the following means to solve the above problems.

A method of producing an absolute pressure type pressure sensor according to the present invention is characterized by comprising: a step of arranging a relative pressure type pressure sensor, that has a reference pressure chamber therein, and a pressure guide hole whose one end communicates with the reference pressure chamber and the other end opens to the atmosphere, inside a vacuum chamber with the other end of the pressure guide hole opening upward; a step of placing a solder piece onto the other end of the pressure guide hole; a step of drawing a vacuum inside the vacuum chamber; and a step of heating the solder piece until the solder melts.

According to the method of producing an absolute pressure type pressure sensor, after the relative pressure type pressure sensor having a predetermined amount of solder placed on the pressure guide hole in advance is arranged inside the vacuum chamber, or after placing the predetermined amount of solder onto the pressure guide hole of the relative pressure type pressure sensor that is already arranged in the vacuum chamber, a vacuum is drawn inside the vacuum chamber and the reference pressure chamber by for example a vacuum pump, to give a vacuum state, and then the solder is heated and melted, and the melted solder blocks the other end of the pressure guide hole, and thus an absolute pressure type pressure sensor in which a vacuum state is formed inside the reference pressure chamber, is produced.

A device for producing an absolute pressure type pressure sensor according to the present invention includes: a vacuum pump; a vacuum chamber in which a vacuum is drawn in the interior by the vacuum pump; and a heating device comprising: a holder on which is mounted a relative pressure type pressure sensor, that has a reference pressure chamber thereinside, and that has a pressure guide hole whose one end communicates with the reference pressure chamber and the other end opens to the atmosphere, and a heater that heats the holder, and which is located inside the vacuum chamber.

According to such a device for producing an absolute pressure type pressure sensor, after mounting the relative pressure type pressure sensor on the holder with the other end of the pressure guide hole opening upward, or after the relative pressure type pressure sensor, with the predetermined amount of solder placed on the pressure guide hole in advance, is mounted on the holder, a vacuum is drawn in the vacuum chamber and the reference pressure chamber by the vacuum pump to give a vacuum state. Then in this state, the solder is melted by activating the heater and heating the holder, the relative pressure type pressure sensor, and the solder until they reach the temperature at which the solder melts, so that the other end of the pressure guide hole is blocked by the melted solder, thus producing an absolute pressure type pressure sensor in which a vacuum state is formed in the reference pressure chamber.

According to the method and device for producing an absolute pressure type pressure sensor according to the present invention, there are effects in that it is possible to produce an absolute pressure type pressure sensor in a simple and easy manner, and moreover it is possible to modify (convert) a relative pressure type pressure sensor into an absolute pressure type pressure sensor.

BEST MODE FOR CARRYING OUT THE INVENTION

Hereunder is a description of an embodiment of a device for producing an absolute pressure type pressure sensor according to the present invention, with reference to drawings.

Figure 1:
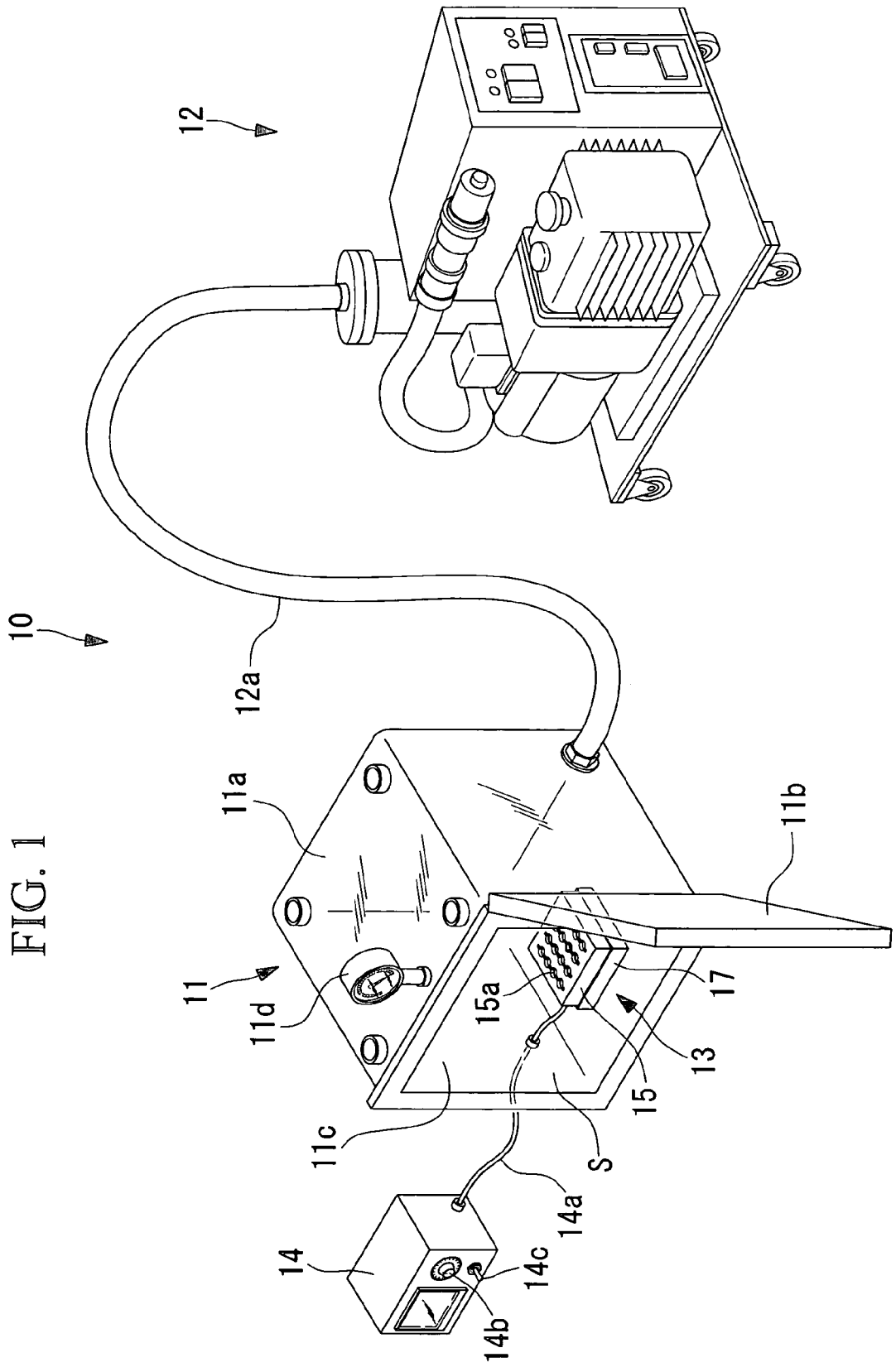
FIG. 1 is an overall perspective view showing one embodiment of a device for producing an absolute pressure type pressure sensor according to the present invention.

As shown in FIG. 1, a device 10 for producing an absolute pressure type pressure sensor according to the present embodiment, comprises; a container (vacuum chamber) 11, a vacuum pump 12, a heating apparatus (heating device) 13, and a temperature controller 14 as the main components.

The container 11 is a hollow container substantially cubic shape in appearance, made from a material that is transparent optically and see-through from the outside, and comprises a container main body 11a and a door 11b.

The front side (the lower-left side in FIG. 1) of the container main body 11a is provided with an opening portion 11c, through which a user can access an interior space S formed inside the container main body 11a.

The door 11b is configured so that it can open and close the opening portion 11c of the container main body 11a, with one edge (the edge at the lower side in FIG. 1) attached to the container main body 11a via a hinge (not shown in the drawing), and the other edge (the edge at the left side in FIG. 1) is provided with a locking device (not shown in the drawing) (such as a catch lock or a hook lock comprising a hook and a pawl).

Therefore, when the door 11b is closed, and the door 11b is closely contacted with the container main body 11a and is fixed by the locking device, an enclosed space is formed inside the container 11.

Also, the center part on the front side of the upper face of the container main body 11a is provided with a vacuum gauge 11d that can measure the degree of vacuum in the container 11.

The vacuum pump 12 is a pump, such as a rotary vacuum pump that mechanically sweeps out air, that makes the interior space S in the container 11 a vacuum state with the door 11b being closed, via a hose 12a which is connected to the lower back portion of the one surface (the lower-right face in FIG. 1) of the container main body 11a and which communicates with the interior space S of the container 11.

Figure 2:
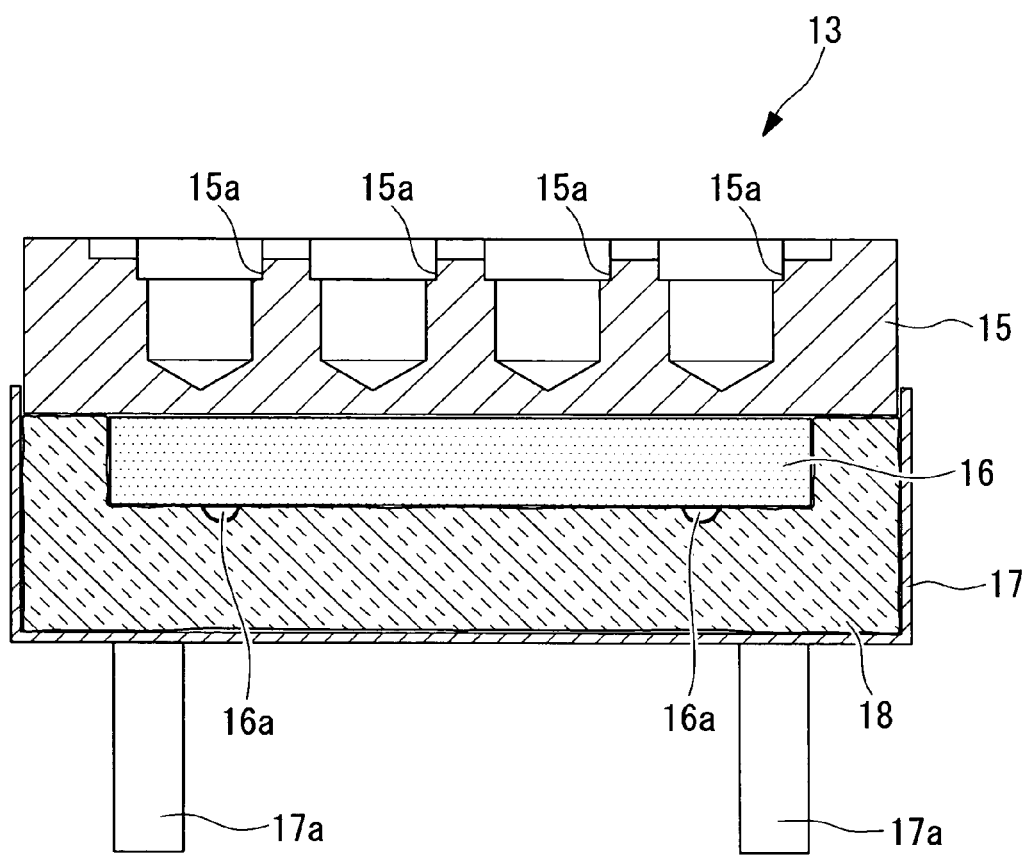
FIG. 2 is a longitudinal sectional view of a heating device shown in FIG. 1.

As shown in FIG. 2, the heating apparatus 13 comprises a holder 15, heater 16, and a holder case 17 as its main components.

The holder 15 is for example made of aluminum alloy (such as A5052) that is alumite treated, and on the upper face thereof, are formed a plurality (16 in this embodiment) of concave areas 15a, that are circular shaped in plan view (refer to FIG. 1) and in which pressure sensors can be mounted.

The heater 16 is heated by, for example, Joule heat that is generated when an electric current is applied to heating wires such as nichrome wires arranged therein, and the temperature of the heater 16 is adjusted by a temperature controller 14 so that, for example, the pressure sensor mounted on the concave area 15a becomes about 210° C.

Also, the heater 16 is, for example, attached so that its upper face contacts with the bottom face of the holder 15, via fixing members such as pan head screws 16a. That is to say, the arrangement is such that the heat produced by the heater 16 is efficiently transmitted to the holder 15.

The holder case 17 is made for example from stainless steel (such as SUS304), and surrounds the circumference of the bottom end portion of the holder 15, and accommodates the heater 16 and a thermal insulator 18 thereinside. The thermal insulator 18 is arranged so that it covers (encloses) the entire heater 16, so that almost all the heat from the heater 16 is transmitted to the holder 15.

Also, the bottom face of the holder case 17 is provided with four leg portions 17a that extend downward vertically.

As shown in FIG. 1, a temperature controller 14 is connected to the heater 16 (refer to FIG. 2) via a cable 14a, and is configured so that the temperature of the heater 16 can be adjusted to a desired temperature by rotating a knob 14b located on the front face thereof.

Here a specific example of a pressure sensor 20 that is subsequently mounted in the concave area 15a of the holder 15 (one that has already been produced as a relative pressure type pressure sensor; hereunder referred to as a "relative pressure type pressure sensor") is described, using FIG. 4.

The relative pressure type pressure sensor 20 has a substantially cylinder hollow shape appearance, and comprises a base 21, and a diaphragm portion 22 as its main components.

Figure 4:
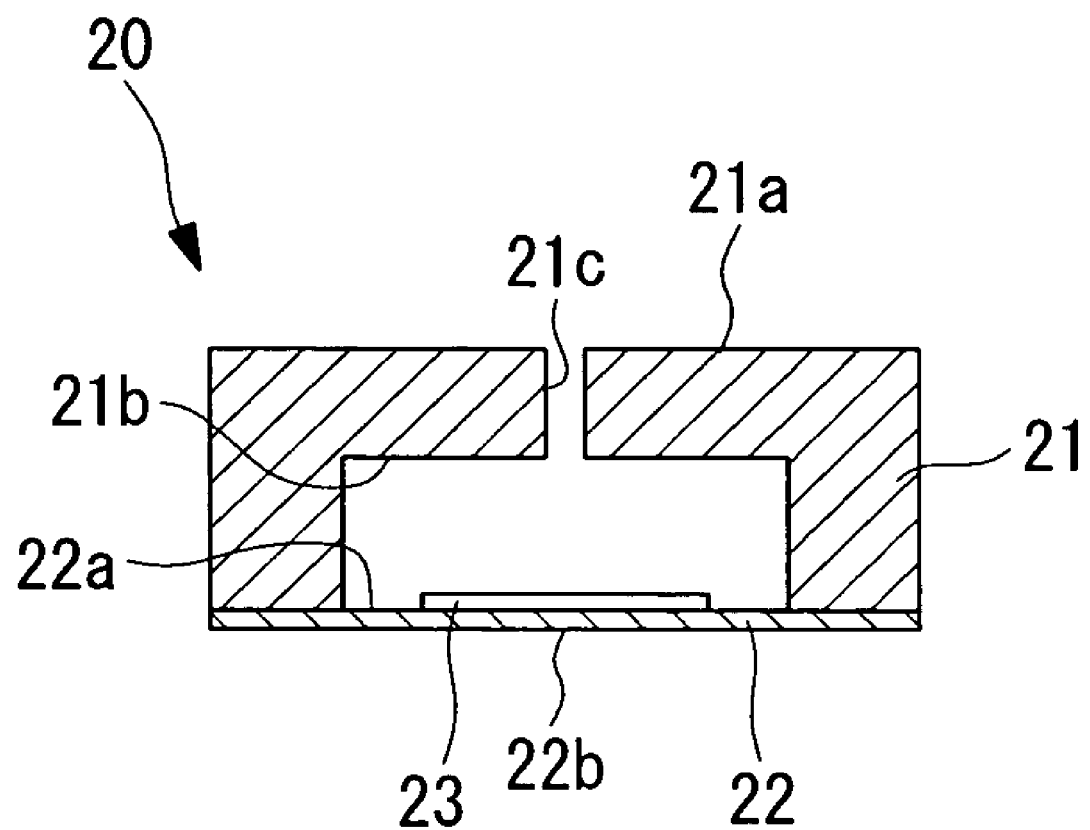
FIG. 4 is a longitudinal sectional view for explaining the relative pressure type pressure sensor shown in FIG. 3.

As shown in FIG. 4, the base 21 is a member with a C-shape cross-section, and is provided with a pressure guide hole 21c at the center part thereof, that communicates between one surface 21a (the upper face in FIG. 4) and another surface 21b (the lower face in FIG. 4) of the base 21. The material of the base 21 may be anything that is not corroded by the pressure medium to be measured, and includes for example, a glass body, ceramic, metal (such as stainless steel or Hastelloy C), or silicon.

The diaphragm portion 22 is a thin disc shaped member that is made of ceramic, metal (such as stainless steel or Hastelloy C), silicon, etc, and is formed with a Wheatstone bridge circuit 23 with a strain gauge at the inner surface 22a thereof. Detection of the pressure of the pressure medium is executed by means of a so-called piezoresistance effect that occurs when the pressure medium is applied to the center part of the outer surface 22b of the diaphragm portion 22 (or to the center part of the inner surface 22a), so that the diaphragm portion 22 is deflected (distorted), thus changing the energy structure in the Wheatstone bridge circuit 23, so that the amount of travel of carriers (positive holes or electrons) changes accordingly, and the electric resistance of the material changes.

The opposite side to the side that the pressure of the pressure medium is applied, that is, the center part of the inner surface 22a of the diaphragm portion 22 (or the center part of the outer surface 22b) is subjected to atmospheric pressure. As a result, the relative pressure (gauge pressure) can be measured.

Next, the method of modifying (converting) such a relative pressure type pressure sensor 20 into an absolute pressure type pressure sensor using the aforementioned device 10 for producing an absolute pressure type pressure sensor, that is, the method of producing an absolute pressure type pressure sensor, will be described using the drawings.

Figure 3A:
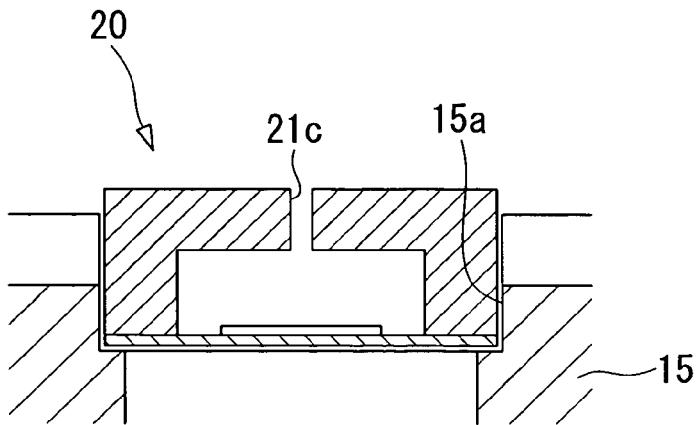
FIG. 3A to C are views for explaining a method of producing an absolute pressure type pressure sensor according to the present invention, wherein A is a state in which relative pressure type pressure sensors are mounted in concave areas of a holder, B is a state in which a solder piece is placed on a pressure guide hole of a relative pressure type pressure sensor, and C is a longitudinal sectional view showing a state in which the solder is heated and melted, blocking the pressure guide hole.

First, the door 11b of the container 11 is opened as shown in FIG. 1, and through the opening portion 11c of the container main body 11a, relative pressure type pressure sensors 20 are respectively fitted (mounted) one by one into the concave areas 15a of the holder 15 that is arranged inside the container main body 11a, with their pressure guide holes 21c opened upward as shown in FIG. 3A.

Then, on each pressure guide hole 21c of the relative pressure type pressure sensor 20 mounted in each concave area 15a, a solder piece 25 that is sufficient to block the pressure guide hole 21c is placed one by one.

After the solder pieces 25 are placed on all the pressure guide holes 21c of the relative pressure type pressure sensors 20, the door 11b is closed and fixed to the container main body 11a by the locking device, and the enclosed space is formed in the container 11.

After the enclosed space is formed in the container 11, the vacuum pump 12 is activated and the interior space S of the container 11 is made a vacuum state via the hose 12a. In this process, because the solder pieces 25 are merely placed on the pressure guide holes 21c, the air in the interior space of the relative pressure type pressure sensors 20, namely the reference pressure chambers S1 that communicate with the pressure guide hole 21c, are also made a vacuum (evacuated) through the gap between the surface of the solder piece 25 and the open end of the pressure guide hole 21c, making the reference pressure chamber S1 of the relative pressure type pressure sensor 20 a vacuum state. Whether the interior of the container 11 has become a vacuum state or not can be detected by the vacuum gauge lid attached on the upper surface of the container main body 11a.

After the vacuum state of the interior of the container 11 is confirmed by the vacuum gauge 11d, a switch 14c (refer to FIG. 1) of the temperature controller 14 is turned on, and the heater 16 is heated. At this time, the knob 14b is adjusted (rotated) so that the temperature of the relative pressure type pressure sensors 20 mounted in the concave areas 15a becomes for example about 210° C. When the heater 16 is heated and the temperature of the relative pressure type pressure sensors 20 reaches about 180° C., the solder pieces 25 start melting and deforming, blocking the pressure guide holes 21c completely as shown in FIG. 3C.

When the solder pieces 25 have melted and all the pressure guide holes 21c of the relative pressure type pressure sensors 20 are confirmed to be blocked by the solder pieces 25, the switch 14c of the temperature controller 14 is turned off, and heating of the heater 16 is stopped. Together with this, the operation of the vacuum pump 12 is stopped, and the interior of the container 11 is restored to the atmospheric pressure state, and the absolute pressure type pressure sensors 30 which are mounted in the concave areas 15a of the holder 15 and in which a vacuum state is formed in the reference pressure chamber S1, are retrieved to complete the series of the operations.

The vacuum pump 12 is operated until the solder pieces 25 solidify. That is, after the solder pieces 25 solidify, operation of the vacuum pump 12 is stopped.

As a result, according to the method of producing an absolute pressure type pressure sensors and/or the device for producing an absolute pressure type pressure sensor of the present invention, it is possible to modify (convert) a relative pressure type pressure sensor into an absolute pressure type pressure sensor, in a simple and easy manner.

The form of the relative pressure type pressure sensor before being modified into an absolute pressure type pressure sensor is not restricted to the above embodiment, and may be of any form that has a reference pressure chamber inside and a pressure guide hole that communicates between this reference pressure chamber and the atmosphere.

The shape in the plan view of the concave area formed in the holder is not restricted to the aforementioned circular shape, and may vary depending on the shape of the relative pressure type pressure sensor.

Figure 3B:
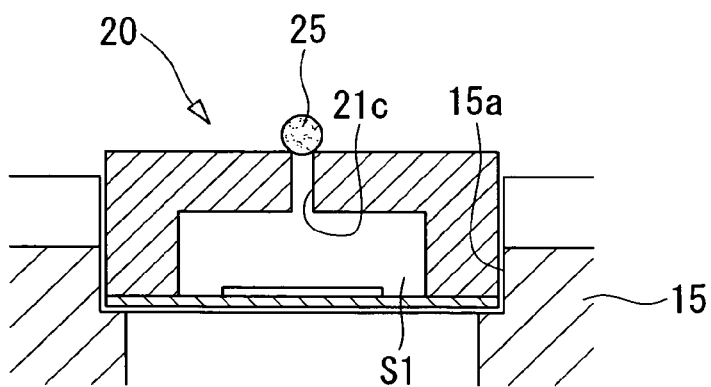
Figure 3C:
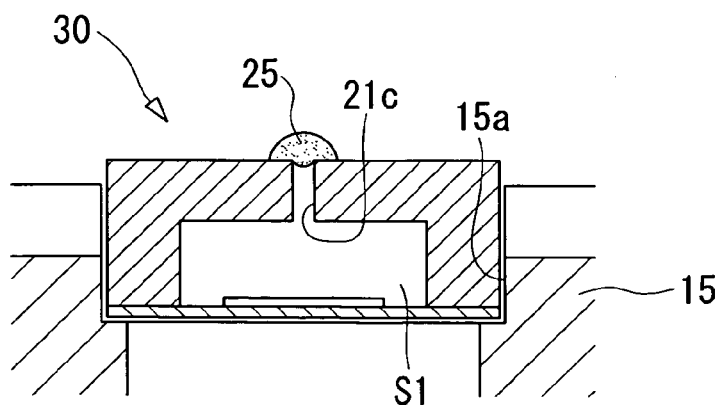

Furthermore, the shape of the solder pieces placed on the pressure guide holes are not restricted to the spherical shape as shown in FIG. 3B, and may be, for example, a linear shaped solder piece cut into a short length.

Moreover, in the method of producing described using FIG. 3A to FIG. 3C, the solder pieces are placed on the pressure guide holes after the relative pressure type pressure sensors are mounted in the concave areas of the holders. However, the present invention is not restricted to this, and the solder pieces may be placed on the pressure guide holes in advance outside the container, and the relative pressure type pressure sensors may then be mounted in the concave areas of the holders.

Furthermore, in the aforementioned embodiment, as an example of the relative pressure type pressure sensor 20, a strain gauge type is described, however the present invention is not restricted to this, and this may be an electrical capacitance type.

Moreover, the present invention is not only applicable to modifying (converting) an existing relative pressure type pressure sensor into an absolute pressure type pressure sensor, but can also be applied to producing an absolute pressure type pressure sensor from the beginning.

The invention claimed is:

1. A method of producing an absolute pressure type pressure sensor characterized by comprising:
    a step of arranging a relative pressure type pressure sensor, that has a reference pressure chamber therein, and a pressure guide hole whose one end communicates with said reference pressure chamber and the other end opens to the atmosphere, inside a vacuum chamber with the other end of said pressure guide hole opening upward;
    a step of placing a solder piece onto the other end of said pressure guide hole so as to block an entirety of the other end of said pressure guide hole;
    a step of drawing a vacuum inside said vacuum chamber; and
    a step of heating said solder piece until said solder melts.

2. A device for producing an absolute pressure type pressure sensor comprising:
    a vacuum pump;
    a vacuum chamber in which a vacuum is drawn in the interior by said vacuum pump; and
    a heating device comprising a holder on which a plurality of relative pressure type pressure sensors are mounted together, each of said plural relative pressure sensors has a reference pressure chamber thereinside, and each has a pressure guide hole whose one end communicates with a respective said reference pressure chamber and the other end opens to the atmosphere, and a heater that heats said holder, and which is located inside said vacuum chamber.

3. A device for producing an absolute pressure sensor, said device comprising:
    a vacuum pump;
    a vacuum chamber in which a vacuum is established in an interior thereof by said vacuum pump; and
    a heating device including a heating element and a holding element mounted on said heating element, said holding element including a surface for mounting a plurality of relative pressure sensors at one time, each of said plural relative pressure sensors has a reference pressure chamber inside and each has a pressure guide hole that communicates with a respective said reference pressure chamber, an other end of each of said pressure guide hole opens to atmosphere, said heating device being inside said vacuum chamber.

* * * * *